Figure 1:
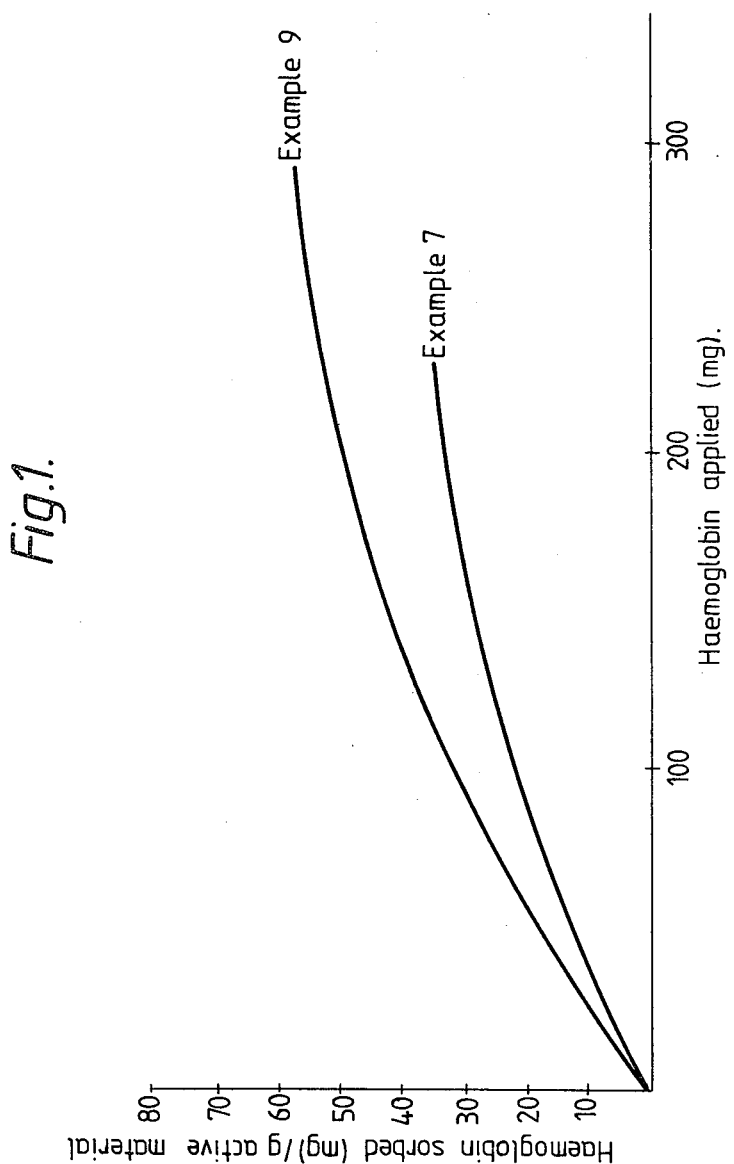

United States Patent [19]

Rosevear

[11] 4,443,339
[45] Apr. 17, 1984

[54] COMPOSITE MATERIALS

[75] Inventor: Alan Rosevear, Uffington, England

[73] Assignee: United Kingdom Atomic Energy Authority, London, England

[21] Appl. No.: 299,294

[22] Filed: Sep. 3, 1981

[30] Foreign Application Priority Data

Sep. 11, 1980 [GB] United Kingdom ............... 8029342

[51] Int. Cl.³ ............................................. B01D 15/08
[52] U.S. Cl. ..................................... 210/635; 210/658; 210/679
[58] Field of Search ............... 210/635, 656, 698, 679, 210/500.2, 502, 507, 508, 198.2; 427/204, 243, 244, 333, 340, 342, 344, 385.5, 387, 394

[56] References Cited

U.S. PATENT DOCUMENTS

| | | | |
|---|---|---|---|
| 3,791,523 | 2/1974 | Okumura et al. | 210/198.3 |
| 3,878,100 | 4/1975 | Bixlea | 210/507 X |
| 3,922,432 | 11/1975 | Aenn | 210/500.2 |
| 4,072,793 | 2/1978 | Watanabe et al. | 210/307 |
| 4,171,390 | 10/1979 | Hilterhaus et al. | 427/244 |
| 4,180,611 | 12/1979 | Freudenberg | 210/500.2 |
| 4,248,736 | 2/1981 | Fuchigami et al. | 210/502 X |
| 4,251,597 | 2/1981 | Emmons | 427/385.5 |
| 4,267,047 | 5/1981 | Henne et al. | 210/502 |
| 4,335,017 | 6/1982 | Miles et al. | 210/635 X |

Primary Examiner—John Adee
Attorney, Agent, or Firm—Larson and Taylor

[57] ABSTRACT

The present invention relates to composite materials. A composite material is disclosed for the selective retention of chemical species from a fluid substance. The composite material comprises a support material, a permeable gel retained on the support material and, in the permeable gel, an active material capable of selectively retaining the chemical species.

At least some of the permeable gel is enmeshed with the support material.

A method for the preparation of the composite material is also disclosed.

13 Claims, 4 Drawing Figures

COMPOSITE MATERIALS

The present invention relates to composite materials.

More particularly the present invention relates to composite materials for the selective retention of chemical species from a fluid substance, the preparation of such composite materials and their use.

A large number of organic and inorganic materials have useful active properties in being able selectively to retain chemical species from a fluid. However many suffer from undesirable physical characteristics which can give rise to difficulties in use, particularly when the use is on a large, industrial scale.

Thus some sorbent inorganic materials are finely divided powders which can be difficult to use in industrial applications due to problems in quantitative removal of suspended material from a batch stirred tank reactor or due to poor flow rates when used in a packed bed or column reactor.

Also some sorbent organic materials (e.g. ion exchangers) are highly compressible and can change size at various stages in use.

In accordance with the present invention inorganic and organic materials having undesirable physical properties as discussed above may be incorporated in a supported, permeable gel and thus made easier to handle and use.

U.S. Pat. No. 3,922,432 discloses, inter alia:

"A thin layer medium for use in chromatographic or electrophoretic processes or radioimmunoassy procedures, said medium comprising an exposed surface layer of discrete particles of solid material containing sorbed water, said particles being of a size on No. 18 screen U.S. Standard Sieve Series, said particles being bonded to a sheet of hydrated gel material, said sheet being a continuous layer formed by the gelling of an aqueous solution of gelling agent".

The said U.S. Pat. No. 3,922,432 also discloses:

"A medium for use in chromatographic or electrophoretic processes or radioimmunnoassay procedures, said medium comprising an exposed surface layer of discrete particles of solid material containing sorbed water, said particles being of a size to pass a No. 18 screen U.S. Standard Sieve Series, said particles being dispersed in a sheet of hydrated gel material, said sheet being a continuous layer formed by the gelling of an aqueous solution of gelling agent, said sheet being scored to expose the surface of said particles".

The scoring may be effected with, for example, a scalpel and it is disclosed that, optionally, the sheet may be bonded to a support member such as glass or polyethylene terephthalate.

In accordance with the present invention the active material is not "exposed" but is protected in a permeable gel which is enmeshed with a support material and thus any tendency for active material to be lost by attrition which would be encountered with exposed active material is substantially avoided. Furthermore, the permeable gel in accordance with the present invention is not scored nor cut to expose the active material and thus any weakness in the permeable gel which would be introduced by scoring or cutting is substantially avoided.

According to one aspect of the present invention there is provided a composite material for the selective retention of chemical species from a fluid substance containing said chemical species which composite material comprises a support material, a permeable gel retained on the support material and, in the permeable gel, an active material capable of selectively retaining the chemical species, the active material being retained and distributed in the permeable gel on the support material and at least some of the permeable gel being enmeshed with the support material.

According to another aspect of the present invention there is provided a method for the preparation of a composite material for the selective retention of chemical species from a fluid containing said chemical species which comprises applying a gel precursor to a support material, said gel precursor containing an active material capable of selectively retaining the chemical species, and gelling the gel precursor to form a composite material comprising the support material, a permeable gel retainer on the support material, and, in the permeable gel, the active material, the active material being retained and distributed in the permeable gel on the support material and at least some of the permeable gel being enmeshed with the support material.

It will be appreciated that a precursor for the active material can be retained in the permeable gel in accordance with the present invention and subsequently converted to the active material per se.

It will also be appreciated that the gel precursor, the permeable gel, the gelling and support material are selected to permit at least some of the permeable gel to be enmeshed with the support material.

By "permeable gel" it is meant in this specification that the permeable gel is capable of permitting chemical species which are to be retained selectively by the active material to migrate through from the fluid substance to reach the active material.

The permeable gel can be formed from any gel precursor which can be converted to a stable permeable gel capable of (i) being retained on the support material with at least some permeable gel being enmeshed with the support material and (ii) retaining the active material.

Further the permeable gel should not be such that it interacts adversely with either the active material, the support material or the fluid and chemical species with which it comes into contact in use.

The active material is such that it can interact with the chemical species thereby selectively to retain the chemical species.

Thus, for example, the active material may have sorptive properties. Sorptive properties include absorption and adsorption (which includes physisorption and chemisorption). The active material can be chosen such that the interaction between it and the chemical species is predominantly chemical (e.g. ion exchange) or predominantly physical (e.g. gel permeation and gel filtration).

The active material can be chosen from a wide range of organic and inorganic materials which have useful active properties in being able selectively to retain chemical species from a fluid.

Materials which may be used as the active material in accordance with the present invention include many minerals, clays and inorganic powders, (e.g. aluminosilicates (such as those available under the trade names Alusil and Fuller's Earth), zinc oxide, titania, hydroxylapatite) and organic materials (e.g. ion exchangers based on a carbohydrate back-bone such as DEAE-cellulose).

The gel precursor can, for example, contain the active material and a gel forming material which can be gelled after application to the support material thereby to form a permeable gel in which the active material is retained.

Preferably the rheological properties of the gel precursor containing the active material are chosen to facilitate the application to the support material. It is also preferred, that the rheological properties of the precursor are chosen to facilitate retention thereof on the support material prior to and during the gelling and/or to inhibit sedimentation of the active material prior to, and during, gelling. The rheological properties of the gel precursor can optionally be controlled by the addition thereto of a viscosity enhancing agent. Thus, where, for example, the viscosity of a gel precursor comprising active material and a gel forming material is too low for a given application the viscosity can be increased to the desired level by incorporation of a viscosity enhancing agent. Viscosity enhancing agents are discussed in more detail hereinafter.

The gel precursor can be formed, for example, by suspending the active material in a gel forming material and/or a viscosity enhancing agent depending upon the chosen constituents of a particular gel precursor.

The gel forming material, if used, and viscosity enhancing agent, if used, should be such that there is no adverse interaction with either the active material or the support material nor any substantial disruption of the gel structure as a result of any permanent grafting of the gel to the viscosity enhancing agent. Similarly the permeable gel formed by gelling the gel precursor should be such that it does not adversely interact with the support material nor with fluids and chemical species with which it comes into contact in use.

In the case of a composite material to be used for sorbing chemical species from aqueous solution the permeable gel is preferably a hydrogel.

The choice of support material and the rheological properties of the gel precursor (e.g. consistency and physical properties such as viscosity) may, for example, be such that the gel precursor can be spread onto a support material and such that substantially none of the gel precursor applied to the support material leaves the support material prior to and during the gelling of the precursor.

By way of further example, lower viscosity gel precursors can be used in conjunction with a mould which retains the gel precursor in contact with the support material during gelling. Such lower viscosity gel precursors should have rheological properties such as to inhibit the settling out (i.e. sedimentation) of the active material prior to and during the gelling.

The support material which is to provide dimensional stability to the composite material can be any suitable two- or three-dimensionally stable material capable of retaining the permeable gel and capable of allowing at least some of the permeable gel to enmesh with it.

Examples of "two-dimensionally" stable materials are nylon mesh, steel mesh and woven materials such as loosely woven cloth (e.g. that available under the trade name "J-cloth" available from Johnson and Johnson Limited). In the cases of meshes and loosely woven cloth the permeable gel can be enmeshed with the support in the sense that the some of the gel precursor will have passed through holes of the mesh or cloth weave with the result that, after gelling, there is permeable gel on both sides of the mesh or cloth so that the support material is encased by, and enmeshed with, the permeable gel. The support material thus acts to "reinforce" the permeable gel. In the case of using a mesh or cloth the thickness of the gel is preferably not greater than that which can be protected by the mesh or cloth (e.g. typically not more than 3 mm away from the face of the mesh or cloth). Where the permeable gel is to be retained predominantly on the surface of the support material it is preferred that the surface of the support material is either rough, irregular, porous or otherwise capable of allowing at least some of the permeable gel to "key" to it and thereby to allow at least some of the permeable gel to enmesh with the support material.

Examples of three-dimensionally stable support materials are porous materials such as porous particles made by a method as disclosed in British Pat. No. 1,421,531 (UKAEA).

Other examples of support materials are thin section sponges, roughened metal plates and ceramic surfaces.

It will be appreciated that in the case of porous support material (e.g. porous particles) with inter-connected internal porosity, it can be arranged if desired, that the majority of permeable gel containing the active material is present within the pores of the porous support material rather than on the surface thereof.

Thus it is to be understood that in this context "retained on the support material" is used in this specification to embrace also "retained in the support material".

Where the permeable gel is to be retained on the support material pedominantly by being in the pores of the support material the gel precursor containing active material may be applied to the support material in a volume sufficient just to fill the pore volume.

After gelling it is preferred to wash away any loosely bound permeable gel prior to using the composite material for effecting selective retention. Thus, for example, in the case of a composite material suitable for use in a packed bed reactor, and comprising porous particles with permeable gel contacting active material in the pores of the particles, it is preferred to remove permeable gel which is not stably enmeshed within the particles. It will be appreciated that this is to remove loose, non-rigid, permeable gel from between the particles and thereby inhibit the tendency of a bed to compress in use.

The gelling of the gel precursor can be effected in a number of ways depending upon the composition thereof.

Thus in one embodiment the gel pecursor contains a gel forming material which is a polymerisable material and gelling is then effected by polymerising said polymerisable material.

For example, gelling may be effected by forming a homo-polymer within the gel precursor thereby to give a permeable gel. By way of example predominantly homo-polymeric gels can be formed by radical initiation of monomers such as acrylic or vinyl monomers. The monomer is preferably water soluble (e.g. acrylamide, hydroxyethylmethacrylate, acrylic acid, a high molecular weight diacrylate, a high molecular weight methacrylate or a mixture of these) or is such that it can be maintained in a micro-emulsion (e.g. acrylonitrile).

To assist in providing good gel strength it is usually preferred to include a di-functional compound as a minor component in the monomer mixture. Such di-functional compounds can be acrylics such as NN'-methylene-bis-acrylamide or glyoxal-bis-acrylamide.

Radicals may be generated for example by use of persulphate, peroxide or radiation (ultra violet or gamma) or or transition metal ions.

In another embodiment where the gel precursor also contains a viscosity enhancing agent gelling of the precursor can be effected, for example, by grafting polymer to the viscosity enhancing agent.

Some degree of grafting to the viscosity enhancing agent can be expected in many polymerisations, but is likely to be greatest when one electron transfer agent is introduced to the gel precursor. Such electron transfer agents include Fe(II), Ce(IV) and Ti(III).

In a further embodiment gelling of the gel precursor can be effected, for example, by cross-linking the gel forming material and/or the viscosity enhancing agent (when present in the gel precursor). For example alginate esters can be cross-linked to form a permeable gel by use of diamine.

Certain gel forming materials such as viscous polymers can be gelled directly. Thus, for example, alginic and polygalacturonic acids can be cross-linked by calcium ions and maleic anhydride co-polymer can be cross-linked with polyvinyl alcohol. Where viscous gel forming materials which can be directly gelled are used it may be found that it is not necessary to use an additional viscosity enhancing agent providing the gel forming material allows a gel precursor of suitable rheological properties to be prepared at relatively low gel forming material concentrations. Thus for example with alginic maleic anhydride no supplementary viscosity enhancing agent is needed.

Where the permeable gel is an organic polymeric gel, polymers which form gels with very low solids contents (i.e. less than 10% weight per volume) are preferred since this gives a high porosity to the gel and facilitates access of chemical species for selective retention by the active material.

In one embodiment the gel precursor can contain a solution of an organic polymeric material at a temperature above ambient which is capable of setting to a gel on cooling. An example of such a material is agar solution which can be heated to enable it to be spread onto a support material and subsequently cooled to give a rigid permeable gel.

It has been found that an aqueous solution of agar (at approximately 2½% weight per volume) which sets on cooling to form a stable permeable gel is convenient for forming a composite material in accordance with the present invention.

It has been found that when using an organic polymeric material in solution as a gel forming material the nature of the active material (e.g. its particle size, surface area, hydrophicity and degree of hydration) can influence the concentration of polymeric material required with different active material loadings.

In accordance with one embodiment of the present invention the gel precursor is applied to the support material by spreading the gel precursor thereon. The spreading may be effected, for example, with the aid of a brush.

As hereinbefore stated the rheological properties of the gel precursor can be controlled, inter alia, by the use of a viscosity enhancing agent. (This is discussed in more detail hereinafter).

Thus where the gel precursor containing the active material is to be applied by spreading (e.g. with the aid of a paint brush, glass rod or plate spreader) onto a support material the gel precursor is controlled to have a viscosity which, whilst permitting application by spreading, is also sufficiently high to enable the applied gel precursor containing the active material to remain on the support material during the subsequent gelling operation.

Similarly, where the gel precursor containing the active material is introduced into the pores of the support material prior to gelling, the rheological properties are selected to permit entry of the gel precursor into the pores. Where a lower viscosity gel precursor is used the viscosity can be sufficient to inhibit the settling of the active material prior to, and during gelling.

The viscosity enhancing agent should not inhibit gelling particularly when gelling is effected by polymerisation.

It has been found that gel precursors with a viscosity of approximately 1000 cp are convenient for spreading onto horizontal or sloping surfaces. However the rheological properties of a gel precursor can be chosen to suit a particular circumstance. Thus, gel precursors having other viscosities (e.g. between a 100 and 10,000 cp) may be useful in carrying out the method of the present invention where the gel precursor is applied to a support material by spreading thereon.

It will be appreciated that where the gel precursor is to be applied by spreading on a support material the viscosity is preferably such that the gel precursor is sufficiently fluid to be spread evenly on the surface but sufficiently viscous to remain as a coating during subsequent treatment to effect gelling.

The following aqueous solutions and hydrocolloid suspensions are examples of substances suitable for use as viscosity enhancing agents in accordance with the present invention:

Xanthan gum (1%)
Sodium alginate (2½%)
Carboxymethyl cellulose-sodium salt (3%)
Cellulose ethers (2%) (e.g. "Cellacol" produced by British Celanese, Derby)
Polyvinyl alcohol (10%)
Agarose (2½%)
Cold water soluble starch (sold under the name LAP) (5%)
Cellulose paste (sold under the name Polycel) (5%)
Carrageenam (3%)

The above concentrations may need minor adjustments depending upon the nature of the active material. Other viscous substances may be used as viscosity enhancing agents (e.g. acrylic acid, polymers and co-polymers, pectins and other non-toxic polymers).

In one embodiment of the method of the present invention a sheet of composite material for the selective retention of chemical species from a fluid containing said chemical species is prepared by pouring a gel precursor containing an active material capable of retaining the chemical species onto a horizontally stretched cloth or mesh, spreading the gel precursor substantially evenly over the cloth or mesh and thereafter treating the gel precursor on the cloth or mesh to form a permeable gel.

The cloth or mesh carrying the gel precursor may be treated to form a permeable gel by floating the cloth or mesh carrying the gel precursor in a reagent capable of gelling the gel precursor.

In another embodiment a sheet of composite material for the selective retention of chemical species from a fluid containing said chemical species is prepared by spreading a gel precursor containing an active material capable of retaining the chemical species, a gel forming material and an inactivated gelling initiator onto a horizontally stretched cloth or mesh and subsequently activating the gelling initiator thereby to form a permeable gel from the gel precursor.

By way of example the cloth carrying the gel precursor may be placed on a smooth surface and the inactivated gelling initiator activated to form a permeable gel. Activation of the gelling initiator can be, for example, by irradiation or by removing oxygen (e.g. by means of vacuum or purging with an inert gas such as nitrogen).

In a further embodiment the support material may be held between two glass plates separated by a rubber (e.g. silicone) gasket and the gel precursor poured into the remaining space and subsequently gelled.

In the case of lower viscosity gel precursors where the rheological properties are chosen primarily to inhibit the tendency of the active material to settle out prior to, and during gelling, the proportion of a viscosity enhancing agent when used can be chosen just to keep particles suspended prior to and during gelling without making the gel precursor capable of being spread and retained on a support material. For example, a 0.01% Xanthan gum is sufficient to give a viscosity in the range 2 cp-20 cp to inhibit inorganic particles (e.g. of titania) from settling out of the gel precursor.

Similar dilutions of the other viscosity enhancing agents hereinbefore mentioned can be used to give viscosity in the same range (2 cp-20 cp). The size and density of inorganic particles of active material must, of course, be taken into account in choosing the rheological properties.

A sheet of composite material prepared in accordance with the present invention may be used in its flat form to effect selective retention of chemical species.

Alternatively a sheet of composite material prepared in accordance with the present invention can be wound co-axially to give a cylindrical module for use in selective retention of chemical species.

It will be appreciated that a sheet of composite material when wound co-axially gives a "swiss roll" configuration.

It is preferred that an inert spacer is provided between adjacent permeable gel surfaces to provide adequate lumen.

In the case of the co-axially wound configuration this may be achieved by rolling a sheet of composite material and a sheet of inert material together to give a substantially cylindrical "swiss roll" configuration in which radially adjacent permeable gel surfaces are separated by the inert material.

Composite materials may be prepared in filamentatious form in accordance with the present invention and tied together so as to pack co-axially in a column.

According to a further aspect of the present invention there is provided a method for the selective retention of chemical species from a fluid substance containing said chemical species which comprises contacting a fluid containing chemical species to be selectively retained with a composite material prepared by a method in accordance with the present invention.

The chemical species may be subsequently recovered from the composite material (e.g. by elution) as desired.

The invention also provides a composite material prepared by a method in accordance with the invention.

Examples of chemical species which can be selectively retained using a composite material in accordance with the present invention are macromolecules (i.e. molecules of high molecular weight such as protein molecules). Particular examples of macromolecules are serum albumin, γ-globulin, haemoglobin, lyzozyme, ribonuclease, phospholycerate, kinase, lactate dehydrogenase, cytochrome c, urease, ovalbumin, myoglobin, thymus DNA and yeast RNA.

The invention will now be further described by way of example only as follows:

The drawings illustrate selected examples of the use of the invention.

EXAMPLE 1

An active material comprising titania powder (May & Baker, 6 grams) was suspended in a gel forming material comprising 2% w/v agar solution (Oxide 60 mls) at 50° C. The resulting viscous gel precursor was spread onto a support material comprising a 16×36 cm piece of loosely woven cloth (available under the trade name "J-cloth" from Johnson & Johnson Limited) and allowed to cool and thereby form a permeable gel containing titania.

EXAMPLE 2

An active material comprising diethylaminoethyl cellulose (ex Whatman 3 grams) was suspended in a gel forming material comprising a 2% w/v agar solution (Oxoid, 30 mls) at 50° C. The resulting viscous gel precursor was spread onto a support material comprising a 14×18 cm piece of loosely woven cloth (available under the trade name "J-cloth" from Johnson & Johnson Limited) and was allowed to cool and thereby set to form a permeable gel containing diethylaminoethyl cellulose.

EXAMPLE 3

An active material comprising hydroxylapatite (Bio-gel HAP, 3 grams) was swollen in water and then suspended in a gel forming material comprising a 2% w/v agar solution (Oxoid, 30 mls) by stirring gently at 50° C.

The resulting viscous gel precursor was spread onto a support material comprising a 16×18 cm piece of loosely woven cloth (available under the trade name "J-cloth" from Johnson & Johnson Limited) and was allowed to cool and thereby set to form a permeable gel containing hydroxylapatite.

EXAMPLES 4 TO 6

A composite material comprising a cloth impregnated with a permeable gel (having retained therein an active material) prepared as in Example 1 was cut into separate pieces and the pieces used to test the adsorption/desorption of protein at various concentrations. Thus the separate pieces of composite material were placed in dilute solutions of haemoglobin at various concentrations of 5 mg/ml (Example 4) 10 mg/ml (Example 5) and 20 mg/ml (Example 6) volume 15 mls) and left for 45 minutes at 20° C. The samples were then washed with distilled water until no further protein was eluted and the sorbed protein was desorbed using 1 M sodium carbonate solution (15 mls). The quantity of protein desorbed from each sample is shown in Table 1. Subsequent washing with more carbonate and 0.1 M sodium hydroxide increased the total protein desorbed only by a further 10%.

TABLE 1

| Example No. | Concentration of haemoglobin solution used for sorption (mg/ml) | Protein (mg) desorbed per gram of titania | % of protein recovered |
|---|---|---|---|
| 4 | 5 | 30 | 40 |
| 5 | 10 | 48 | 32 |
| 6 | 20 | 50 | 17 |

EXAMPLE 7

A sample of composite material containing as an active material diethylaminoethyl cellulose prepared as in Example 2 was tested as in Examples 4 to 6 for its ability to sorb and desorb proteins. The results are shown in FIG. 1 of the drawings.

EXAMPLE 8

A composite material containing as an active material hydrocxylapatite as prepared in Example 3 was tested for its ability to absorb and desorb lysozyme. Thus, the composite material prepared as in Example 3 was washed with water and a third placed in a solution of lysozyme (2.5 mg protein/ml; 15 ml) for 45 minutes. 75% of the lysozyme was sorbed and could be desorbed subsequently from the material by 0.1 M sodium carbonate solution.

EXAMPLE 9

Further samples of composite material prepared as in Example 1 were tested in respect of their ability to sorb haemoglobin from solution. The results are presented in FIG. 1.

EXAMPLE 10

An active material comprising Alusil N (Trade Mark) (12 g) was suspended in a gel forming material comprising 2% agar w/v solution (Oxoid; 80 mls) at 50° C. The resulting viscous gel precursor was spread onto a support material comprising a 14×36 cm strip of cloth (available under the trade name "J-cloth" from Johnson & Johnson Limited) held horizontally between clips and allowed to cool to room temperature and thereby set (in ~30 sec.) to form on the support material a permeable gel containing the active material Alusil N. The resulting composite material was washed in cold water.

EXAMPLE 11

Figure 2:
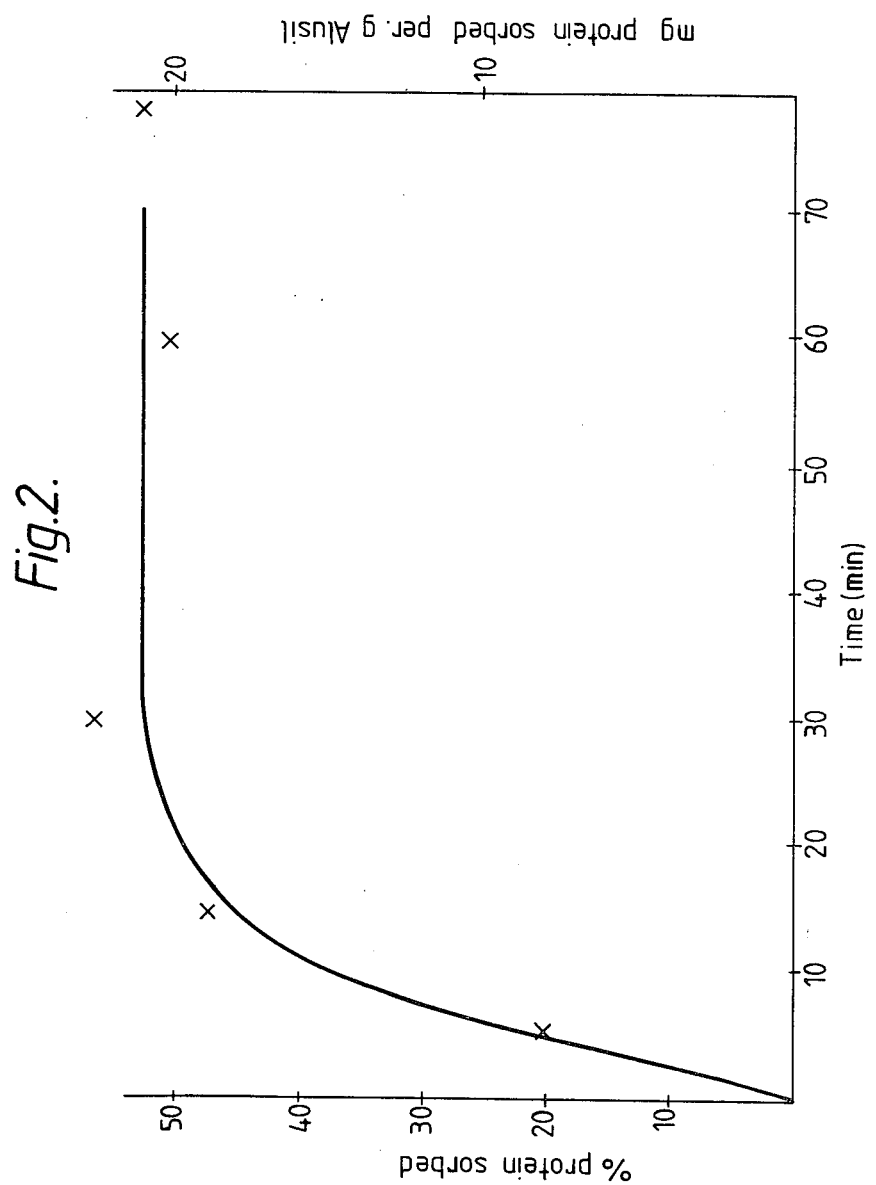

The sorptive capacity of the composite material prepared in Example 10 was investigated using lysozyme in water. The results are given in FIG. 2 which slows the sorption of lysozyme (4 mg/ml) from unbuffered solution.

EXAMPLES 12 TO 16

Five portions of composite material sheet were prepared using Alusil N, agar solution and cloth ("J-cloth") in the manner described in Example 10.

These portions were then used to investigate the influence of pH on the sorption of myoglobin by the composite material.

Thus, five solutions containing myoglobin (2 mg/ml) were prepared and each maintained at a different pH value by use of buffers (50 mM). A portion of composite material was placed in each solution and after 45 minutes the amount of protein remaining in solution was measured by biuret.

The quantity of protein sorbed by each portion was calculated by difference taking into account the 4 ml of fluid held within the composite material.

Figure 3:
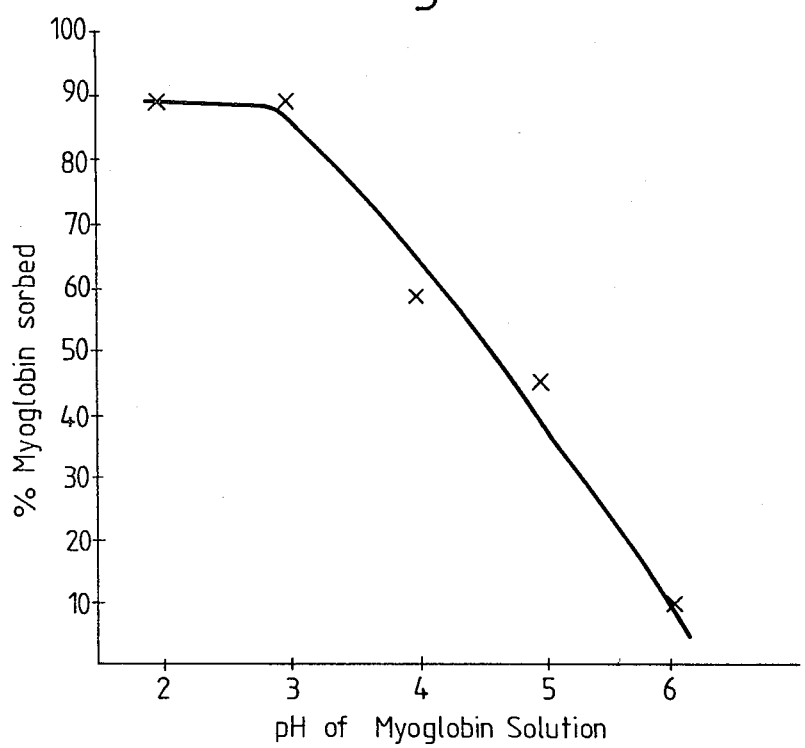
Figure 4:
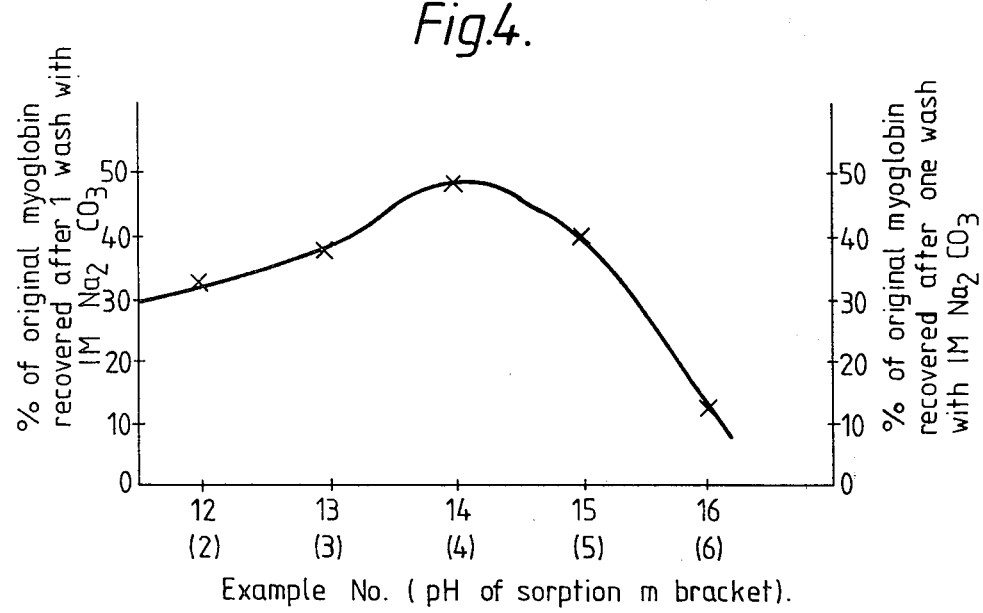

The results are given in FIG. 3 which shows the sorption of myoglobin (2 mg/ml) for each of the portions at pH 2 (Example 12), pH 3 (Example 13), pH 4 (Example 14), pH 5 (Example 15) and pH 6 (Example 16). Subsequently each portion was removed from the myoglobin solution, washed in water and the protein desorbed by use of 1 M sodium carbonate solution (15 ml). The amount of protein from each portion is shown in FIG. 4.

During the operations described in relation to Examples 12 to 16 the portions of composite material were easily transferred between containers by means of forceps and showed no signs of breaking up.

EXAMPLE 17

An active material comprising dry powdered aluminium hydroxide (3 g) was suspended in a gel forming material comprising 2% agar solution (Oxoid, 30 ml) at 50° C. The resulting viscous paste gel precursor was spread evenly onto a support material comprising a 16×36 cm strip of cloth (available under the trade name "J-cloth" from Johnson & Johnson Limited) held horizontally between clips and allowed to cool to room temperature and thereby set (in ~30 secs) to form on the support material a permeable gel containing the active material (aluminium hydroxide). The resulting composite material was washed in cold water.

EXAMPLE 18

A one-third portion of the composite material prepared in Example 17 was placed in a solution of hammerstein casein (ex BDH 2.5 mg/ml, 15 ml) for 45 minutes. 15% of the protein was sorbed and was subsequently removed from the composite material by elution with 0.1 M sodium carbonate solution.

EXAMPLE 19

An active material comprising titania powder (3 g, ex May and Baker) was suspended in a gel forming material comprising 10% acrylamide/0.2% NN'-methylene-bis-acrylamide and 1% Xanthan gum (Sigma) in 0.1 M phosphate buffer pH 7 (30 g). The resulting mixture was purged with nitrogen for 5 minutes, and TEMED solution (10% v/v, 0.3 ml) and ammonium persulphate solution (10% w/v, 0.3 ml) were added.

The resulting viscous paste gel precursor was spread evenly on a support material comprising a 16×36 cm strip of "J-cloth" held between two clips. A glass rod was used to spread the paste evenly.

The cloth and gel precursor were then placed in a vaccum dessiccator for 15 minutes to gel the gel precursor and form on the support material a permeable gel containing the active material (titania). The resulting composite material was washed in water.

EXAMPLE 20

A one-third portion of the composite material prepared in Example 19 was placed in a haemoglobin solution (10 mg/1 ml; 15 ml).

After 45 minutes 44% of the protein had been sorbed by the composite material and was subsequently removed therefrom by elution with 0.1 M sodium carbonate solution.

EXAMPLE 21

Titania powder (3 g, May & Baker) was suspended in 10% w/v acrylamide/0.25% bis acrylamide made up in 0.5% Xanthan gum/0.1 M phosphate buffer (pH 6, 30 g). Nitrogen gas was bubbled through the resulting mixture for 5 minutes and the titania powder evenly distributed in the mixture. 10% w/v ammonium persulphate solution (0.5 ml) and 10% v/v TEMED solution (0.6 ml) were added, the resulting mixture well stirred and then poured into a frame formed by two glass plates separated by a ⅛" silicone gasket and containing a 18×15 cm section of J-cloth held in a nylon bag. After 15 minutes a gel/cloth composite had formed and was removed from the frame. The composite was washed to remove unreacted precursors and loosely bound powder. The composite could be transferred easily and quickly from one fluid bath to another and could be wound spirally (i.e. in a "swiss roll" configuration) for use in a column reactor.

I claim:

1. A method for the selective retention of chemical species from a fluid substance containing said chemical species which comprises contacting a fluid containing chemical species to be selectively retained with an unscored composite material for the selective retention of chemical species from a fluid under conditions whereby the chemical species is selectively removed and retained by the composite material, said unscored composite material being prepared by a method comprising applying a gel precursor to a porous support material in sheet form, said gel precursor containing insoluble particles of active material capable of selectively retaining the chemical species, and gelling the gel precursor to form an unscored composite material comprising the support material, a permeable gel retained on both sides of the support material so that the latter is encased by and enmeshed by, permeable gel having said active material retained and distributed therein.

2. A method as claimed in claim 1 wherein the rheological properties of the gel precursor are chosen to facilitate retention thereof on the support material prior to and during the gelling and/or to inhibit sedimentation of the active material prior to, and during, gelling.

3. A method as claimed in claim 1 wherein the gel precursor comprises the active material and a gel forming material.

4. A method as claimed in claim 3 wherein the gel precursor contains a gel forming material which is a polymerisable material and gelling is effected by polymerising said polymerisable material.

5. A method as claimed in claim 4 wherein gelling is effected by forming a polymeric gel by radical initiation of an acrylic monomer or a vinyl monomer.

6. A method as claimed in claim 4 wherein gelling is effected by cross-linking of the gel forming material.

7. A method as claimed in claim 4 wherein the gel precursor contains an organic polymeric material capable of setting to a gel on cooling and gelling is effected by cooling.

8. A method as claimed in claim 1 wherein the gel precursor contains a viscosity enhancing agent.

9. A method as claimed in claim 8 wherein the viscosity enhancing agent is an aqueous solution or a hydrocolloid suspension of xanthan gum, sodium alginate, carboxymethyl cellulose-sodium salt, cellulose ether, polyvinyl alcohol, agarose, cold water soluble starch, cellulose paste or carrageenam.

10. A method as claimed in claim 1 wherein the active material has ion exchange properties gel permeation properties or gel filtration properties.

11. A method as claimed in claim 10 wherein the active material is an alumino silicate, zinc oxide, titania, hydroxylapatite or an ion exchanger based on a carbohydrate back-bone.

12. A method as claimed in claim 1 wherein the support material is nylon mesh, steel mesh, loosely woven cloth, porous particles, thin section sponge, roughened metal plate or a ceramic surface.

13. A method as claimed in claim 1 wherein a sheet of composite material is prepared in a swiss roll configuration.

* * * * *